May 12, 1959   W. J. HERTER   2,886,198
BOTTLE STOPPING DEVICE
Filed March 14, 1956
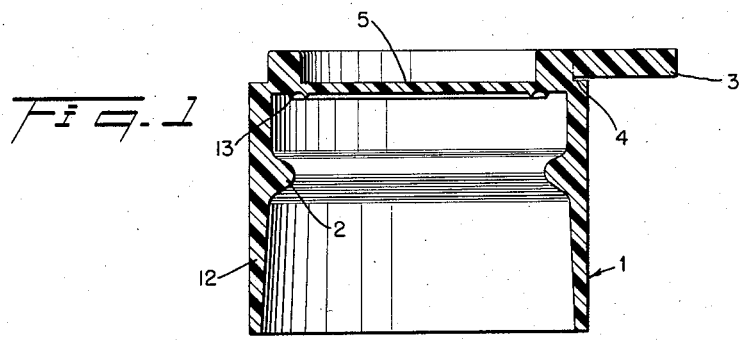
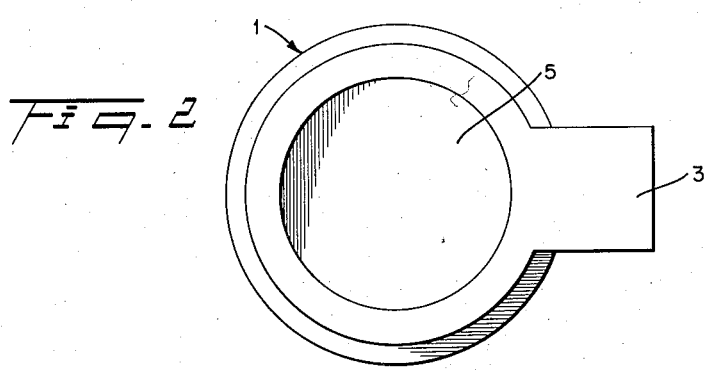
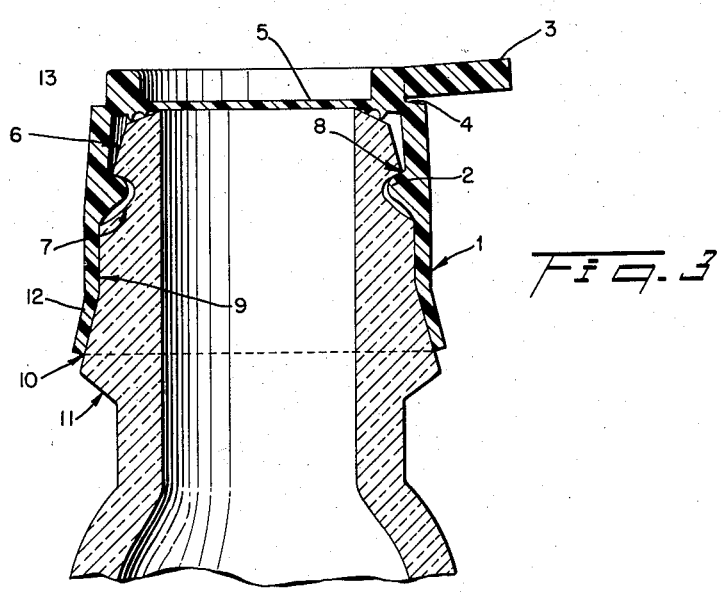

United States Patent Office 2,886,198
Patented May 12, 1959

2,886,198

BOTTLE STOPPING DEVICE

William Jacques Herter, Paris, France

Application March 14, 1956, Serial No. 571,515

1 Claim. (Cl. 215—31)

This invention relates to a plastic device for stopping containers, more particularly glass bottles, and its essential object is to make this stopping both leak-proof and inviolable.

This device is characterised by the combination of a capsule-shaped stopper of adequate plastic material, with the neck of a bottle of glass or other material, the outer contour of this neck being designed to easily receive the capsule and subsequently prevent its removal.

This capsule may be cylindrical with a relatively long skirt portion, a circular inner bead positioned at about mid-height of this skirt; it may comprise a non-capillar sealing device in its bottom and means for removing this capsule by pulling up or tearing same.

The bottle comprises a neck portion of which the outer contour consists of a collar having a very slightly tapered lateral surface and a diameter smaller than the inner diameter of the capsule skirt and slightly greater than the diameter of the aforesaid capsule bead, of a groove forming a sharp-angle connection with the aforesaid collar, an annular portion having a mean diameter slightly greater than the collar diameter and approximately equal to the skirt diameter, and a longer conical portion having a more accentuated taper, the mean diameter of this longer tapered portion being considerably greater than the inner diameter of the skirt.

The circular groove of the neck is connected to the aforesaid annular portion through a moderately inclined portion, and the same may apply to the joint between the conical portion of the neck and the bottle body.

In actual use the capsule is firstly threaded freely on the bottle neck until the skirt engages the cylindrical annular portion of the neck, the inner bead engaging in this position the collar of the neck, then the capsule is forced downwardly so that the capsule bead will resiliently engage the neck groove beyond the lower edge of the collar; as the downward movement of the capsule is continued, the skirt will slide along the larger conical portion of the neck and the bead will locate itself automatically in the groove, whereby it becomes impossible to remove the stopper from the bottle neck.

The forces tending resiliently to retain the bead in the groove against the upper side of this groove which forms a sharp angle with the collar are on the one hand sliding forces acting upon the skirt on the bottle neck which urge the skirt towards the bottle orifice, and on the other hand the resilient drawback-forces tending to urge the capsule top upwards, especially when the capsule is provided in its bottom with sealing devices such as U, V or W-sectioned annular grooves or ridges adapted subsequently to the application of a flattening pressure thereon to urge the capsule upwards.

To remove this capsule, it is necessary to either pull it up, or turn and pull up a lug molded integrally with a thin-sectioned portion of the capsule.

If on account of a malformation of the capsule or of the bottle neck the capsule bead does not engage or engages insufficiently the neck groove the capsule will be loosened from the neck and this constitutes a safety feature and a guarantee.

Of course, any desired types of resilient skirted capsules of plastic material such as polyethylene, alkatene, etc. may be used, as well as bottles, tubular containers, flasks, etc. of any desired and suitable material.

In order to afford a clearer understanding of the invention a preferred embodiment thereof will be described hereafter by way of example with reference to the attached drawings forming part of this specification. In the drawings:

Figure 1 is a diametral section.

Figure 2 a plane view from above showing a plastic capsule made in accordance with the teachings of this invention, and Figure 3 is a sectional view showing a capsule fitted on a bottle.

The stopping device according to this invention utilizes capsules of resilient material, preferably translucent plastic material, and bottles of glass or like materials.

The substantially cylindrical capsule 1 comprises an inner bead 2 positioned at substantially mid-height of the skirt 12 and if desired a pull lug 3 connected to the bottom 5 through a thinner portion 4.

The profile of the bottle neck from the orifice downwards has the following component elements:

A collar 6 having a slightly tapered outer or lateral wall, with a maximum diameter smaller than the inner diameter of the capsule skirt so that the capsule may pass freely over this collar, this collar having however a mean diameter slightly smaller than that of the capsule bead 2; thus, the bead 2 cannot be threaded beyond the collar unless a certain pressure is exerted thereon;

A groove 7 connected through a sharp-angle edge 8 to the collar 6;

A substantially cylindrical annular portion 9 forming a moderate angle with the aforesaid collar, and A conical portion 10 having a more accentuated taper than the collar, connected on the one hand with the aforesaid annular portion and on the other hand through an inner shoulder 11 with the bottle neck.

By way of example the extreme diameters of the collar may vary from 13 mm. to 14.5 mm., the inner diameter of the groove may be 13 mm., the extreme diameters of the annular portion may be 15 mm. and 16 mm., the extreme diameter of the conical portion may be 18 mm., the mean diameter of the capsule skirt may be 15 mm., and the bead diameter 2 may be 13.5 mm. Of course, these dimensions should not be construed as limiting the scope of the invention, as many other sizes and proportions may be taken if desired without departing from the spirit and scope of the invention.

As shown in Fig. 3, upon exerting a pressure on the bottom 5 of the capsule 1, the bead 2 will engage the groove 7 of the bottle neck and at the same time the skirt 12 will resiliently adhere against the conical portion 10.

When the capsule is thus positioned the capsule skirt portion 12 expanded on the aforesaid conical portion 10 of the bottle will tend to slide or creep upwards, and the flattened bottom 5, particularly if a W-sectioned groove 13 is formed therein, will tend, after it has been flattened, to move upwards.

Due to the sharp angle 8 the bead 2 is locked in position in the groove 7 and it becomes impossible to violate this stopping unless it is torn away, for example by turning up the lug 3 to tear the bottom 5 away.

The combination of the extension of the skirt 12 over the conical portion of the bottle neck with the flattening of the annular ridges 13 of the capsule 5 will wedge the bead 2 completely in the groove 7 formed in the bottle neck, thereby counteracting any tearing up of the capsule, even if a lever were inserted between the neck and the base of the capsule.

What I claim is:

Container, notably a glass bottle, adapted to be closed by a cap of elastic material comprising a substantially cylindrical skirt and a bead projecting from the inner surface of said skirt, said container comprising a plurality of successive portions of which the average diameter increases progressively from the orifice towards the body of the container, to form successively, from the orifice, a collar having a lateral wall slightly tapered towards the orifice of the container and of a diameter smaller than the inner diameter of the capsule skirt, followed by a groove forming a sharp angle with said lateral wall and adapted to receive the inner bead of the cap, a cylindrical portion of a diameter slightly greater than the diameter of the collar and a frusto-conical portion tapered towards the orifice of the container and having a mean diameter greater than the inner diameter of said skirt.

References Cited in the file of this patent

UNITED STATES PATENTS

| 1,582,681 | Hammer | Apr. 27, 1926 |
| 2,669,369 | Towns | Feb. 16, 1954 |

FOREIGN PATENTS

| 1,031,269 | France | Mar. 18, 1953 |
| 698,992 | Great Britain | Oct. 28, 1953 |
| 1,097,203 | France | Feb. 16, 1955 |